(12) United States Patent
Miller

(10) Patent No.: US 6,208,612 B1
(45) Date of Patent: Mar. 27, 2001

(54) PROGRAMMABLE SELF-OPERATING COMPACT DISK DUPLICATION SYSTEM USING STACKED SPINDLES

(76) Inventor: David Miller, 1590 Solano Way, Concord, CA (US) 94520

( * ) Notice: Subject to any disclaimer, the term of this patent is extended or adjusted under 35 U.S.C. 154(b) by 0 days.

(21) Appl. No.: 09/039,539

(22) Filed: Mar. 13, 1998

Related U.S. Application Data (60) Provisional application No. 60/040,422, filed on Mar. 13, 1997.

(51) Int. Cl.[7] ..................................................... G11B 17/04
(52) U.S. Cl. ............................................. 369/178; 369/34
(58) Field of Search ................................. 369/24, 29, 30, 369/32, 33, 34, 36, 38, 42, 58, 75.1, 75.2, 84, 178, 191, 192, 196, 197, 201, 202

(56) References Cited

U.S. PATENT DOCUMENTS

| | | | |
|---|---|---|---|
| 5,805,538 | * | 9/1998 | Kamada et al. ........................ 369/34 |
| 5,854,776 | * | 12/1998 | Sakiyama ........................... 369/34 X |
| 5,982,719 | * | 11/1999 | Nishijima et al. ..................... 369/34 |

* cited by examiner

Primary Examiner—Paul W. Huber (57) ABSTRACT

A system for the duplication of binary data onto CD-R disks, the system including a copy unit, a host computer and computer software, the software being installed in the host computer to provide a user interface and to direct the transfer of data from the host computer to the copy unit, the copy unit including a set of multiple stacked recordable disk drives, a set of stacked disk spindles, each spindle affixed to a motorized tray, a transport tower, a printer, and a microprocessor. A robotic disk pickup head on the transport tower is connected to the transport tower with an elevator mechanism for lifting and transporting compact disks. The motorized trays move the disk spindles between a holding location and a transport axis, the transport axis being a vertical line that intersects the center of the robotic disk pickup head. The stacked recordable disk drive trays and printer also receive and eject disks along the transport axis, allowing for the robotic disk pickup head to transport disks from any disk spindle to any stacked recordable disk drive or the printer. The microprocessor concurrently directs the movement of the disk pickup head and the copying of data to the CD-R disks. The system allows for source data to be read from multiple master compact disks inserted in specified stacked recordable disk drive members to provide for random access copying from the multiple master compact disks.

18 Claims, 6 Drawing Sheets

PROGRAMMABLE SELF-OPERATING COMPACT DISK DUPLICATION SYSTEM USING STACKED SPINDLES

BACKGROUND OF THE INVENTION

This application claims priority of provisional application No. 60/040,422 filed Mar. 13, 1997.

Digital compact disks were originally conceived in the early 1980's as a technique to accurately copy and preserve audio recordings intended for sale to a mass market of consumers. As computing power has increased exponentially since that time, information processing tasks unthinkable only a few years ago have become commonplace and require large amounts of data most economically and conveniently stored on digital compact disks.

Until recently the transfer of data onto compact digital disks was a costly procedure economically feasible only when manufacturing a large quantity of copies. Users whose applications required relatively few copies or required frequent data updates could not reap the benefits of this technology, even though low-cost disk-readers were readily available.

The advent of recordable digital compact disks, generally referred to as "CD-R" disks, was intended to allow users to record their own disks and thereby achieve significant savings. Unlike a common compact disk that has been pressed by a mold, a CD-R has a dye layer that is etched by a laser contained in the CD-R disk drive. Once etched, the "burned" CD-R disk is unalterable and will retain data for approximately 75 years.

Several practical problems have prevented CD-R users from attaining maximal efficiency in the copy process, especially when attempting to make multiple disk copies in a short amount of time. The primary problem occurring in this situation is that the data throughput from the data source, such as a file on a hard disk drive or a master compact digital disk, to the write head of the CD-R drive is interrupted during the copy process. Many times when this occurs the data buffer to the write head of the CD-R drive is exhausted and null data is written onto the CD-R disk, making the CD-R disk irrevocably defective.

The frequency of such a defective CD-R disk write increases at least linearly as the drive speed of the CD-R writing head is increased. The industry standard speed is approximately 150K Bytes per second. Some CD-R disk drives can write data at four times this standard speed, but while this increased speed lowers the total copying time, the frequency of defective CD-R disk writes increases as data throughput from the data source is increased.

An additional problem in a volume copying process is the necessity for direct human supervision to prepare CD-R disks for copying, remove the disks from the CD-R disk writer once copying is complete, and then prepare the disks for inspection to ensure no defective CD-R disks are retained in the completed set of copies, and if desired, to label the burned CD-R disks. Aside from the tedium involved that may indirectly add errors, requiring human attention in this process adds a significant labor cost that is added to the end-user price.

The copy speed versus accuracy problem described above is solved when the CD-R disk writer is configured to concurrently copy the data onto multiple CD-R disks. For example, the total copy time for two CD-R disk drives concurrently copying data at 150 K Bytes per second is the same as one CD-R disk drive serially copying two CD-R disks at 300K Bytes per second, and the frequency of disk write errors using the concurrent disk drives is approximately half that of the serial disk drive.

This system uses the concurrent copying method described above and also eliminates the necessity of direct human supervision of the copy process through the unique arrangement of CD-R disk spindle members affixed to motorized trays, the motorized trays transporting the disk spindle members along a transport axis formed by the vertical line passing through the center of a robotic disk pickup head.

The system additionally comprises a set of vertically stacked recordable disk drive members, each disk drive member having a tray loader that receives and ejects disks along the transport axis, allowing for a transport tower containing a disk pickup head to lift a blank disk from a disk spindle member and transports the disk to one of the available stacked CD-R disk drives. After the recording process is complete the disk pickup head retrieves and transports the burned CD-R disk copy to a specified disk spindle member for copied disks.

The electrical and physical configuration of this system provides several additional benefits to users. The arrangement of disk spindle members and recordable disk drive members about the transport axis minimizes the number of moving parts needed to construct the disk transport assembly. This configuration also allows the system to be constructed of discrete modules that can be shipped separately and easily assembled by the user, and also allows for rapid repairs by removal of a malfunctioning module and replacement with a functional module.

Prior disk copy methods only provided for lineal copying of a single source disk. The configuration of this system allows for several master compact disks to be transportable by the transport tower to a selected disk read head so that the copy process from the master compact disks is a random access process.

Yet another benefit provided by this system is the system's ability to test burned CD-R disks for disk write errors, and place defective CD-R disks on a specified disk spindle member, thus isolating the defective CD-R disks from the set of properly burned CD-R disks.

SUMMARY OF THE INVENTION

The programmable, automatic compact disk duplication system of this invention includes a copy unit, a host computer, and computer software. The host computer and computer software provide an interface allowing the user to pre-program the copy unit to perform a completely unattended copy and data verification operation upon blank CD-R disks pre-loaded in the copy unit.

While not required for operation of the duplication system, it is preferred that the duplication system use an IBM PC-clone running a DOS or Windows operating system so that users need not purchase additional computer hardware to operate the duplication system. Hardware-specific computer components necessary to describe the duplication system will reference IBM PC and Windows specifications; however the duplication system is not intended to remain limited to these specifications and a designer skilled in the art would be able to translate these specifications into hardware and software equivalents for systems using Apple, UNIX, or IBM protocols.

The Copy Unit

The copy unit has a main copy assembly with an external vacuum pump. The primary components inside a housing for the main copy assembly include a microprocessor, a set of disk spindle members with each member affixed to a motorized tray, a transport tower, a data transfer unit, a vacuum regulator and an air filtration unit. The external vacuum pump is connected to the vacuum regulator by an air hose leading to a disk suction pickup unit affixed to the transport tower.

1. The Microprocessor

The microprocessor is an internal control unit for the copy unit and is electrically connected to the host computer, the transport tower, the motorized tray members, and all CD-R disk drive heads. In the preferred embodiment, a 8031 microprocessor is used, but any 8-bit microprocessor capable of processing a command set of about 20 commands could be used.

The microprocessor receives user input generated by the software that is executed on the user's host computer. The computer software processes the user input into a set of ASCII commands sent to microprocessor via an RS-232 interface. The ASCII command set used is a variant of the Trace Mountain protocol that is often used to interface software to hardware copy devices. Commands sent by the computer software to the microprocessor consist of one letter or one letter and two digits. Once the microprocessor is sent a command by the host computer, the microprocessor parses the command and sends an electrical signal to the transport tower.

Depending on the command sent by the computer software, the microprocessor will transmit back to the computer software a "ready" indication, an echo of the command received, or a status indication that command received was successfully or unsuccessfully executed. This status indication is then interpreted by the computer software into user readable information displayed on the host computer's video output display.

2. The Disk Spindle Members

A set of disk spindle members are stacked vertically inside the housing of the copy unit. The bottom of each disk spindle member is affixed to a horizontal motorized tray member and projects vertically from the tray member. The diameter of each disk spindle member is slightly smaller than the center hole of a CD-R disk, allowing for free vertical movement of the CD-R disk when the disk is located on the disk spindle member.

The horizontal motorized tray members are spaced vertically a distance greater than the height of each disk spindle member, allowing for free travel of the disk spindle member when the motorized tray members travel horizontally. It is expected that at least two disk spindle members are located in the housing of the copy unit, allowing one disk spindle member to hold blank CD-R disks and the other disk spindle member to hold burned CD-R disks.

3. The Transport Tower

The transport tower is located on the inside wall of the housing opposite the disk spindle members. The transport tower has two vertical supports with a vertical belt positioned between the vertical supports. One end of the vertical belt passes around a pulley wheel affixed to the inside wall of the housing close to the top inner wall of the housing.

The other end of the vertical belt passes around a set of pulley wheel gears that are connected to a motor that causes the belt to rotate when the motor is engaged. Control of the motor is supplied by electrical signals sent by the microprocessor.

An arm for a disk pickup head projects horizontally from the transport tower. One end of the arm is affixed to the belt and has apertures allowing the vertical supports to pass through and support the arm. When the motor rotates the belt, the arm is raised or lowered depending on the direction of rotation of the belt.

The other end of the arm supports a disk pickup head which has a disk suction pickup unit. The disk suction pickup unit is triangle-shaped and has a circular aperture located at its apex. The diameter of the aperture is slightly wider than the diameter of a disk spindle member and travels along a vertical line forming a transport axis as the arm is raised or lowered.

Located on the underside of the disk suction pickup unit near each vertice of the disk suction pickup unit is one suction member and one rubber stopper member. A sensor also protrudes downward from the underside of the disk suction pickup unit and relays an electrical signal back to the microprocessor indicating the presence of a target disk near the disk suction pickup unit.

Additionally, during operation of the disk suction pickup unit, RAM memory located in the microprocessor or electrically connected to the microprocessor retains data for each disk spindle member corresponding to the approximate vertical distance the disk suction unit must travel before retrieving a blank CD-R disk or placing a burned CD-R disk back onto the disk spindle member.

When the disk suction pickup unit is operated, the suction members draw in air, causing the target disk to adhere to the suction members.

The size and placement of the arm and the disk suction pickup unit are chosen so that during a disk pick-up or drop-down operation from a selected disk spindle member, the motorized tray affixed to the selected disk spindle member is configured in its extended position, and the selected disk spindle member passes through the aperture of the disk suction pickup unit.

In a typical disk transport operation, the microprocessor issues a sequential set of electrical signals that are translated into a sequential set of operations performed by the motor, the motorized trays on the stacked recordable disk drive members and supporting the disk spindle members, and the disk suction pickup unit. For example, the following sequential operations controlled by the microprocessor occur when the copy unit transfers the top CD-R disk from a stack of CD-R disks surrounding a selected spindle to the disk suction pickup unit:

the motor raises the disk suction pickup unit to a height such that all components of the disk suction pickup unit are above the top of the selected disk spindle member;

the motorized tray affixed to the selected disk spindle member extends outward so that the selected disk spindle member lies along the transport axis;

1) the motor lowers the disk suction pickup unit along the disk spindle member until the suction members make contact with the CD-R disk;

the suction members engage and hold the CD-R disk;

the motor raises the disk suction pickup unit along the disk spindle member until the CD-R disk held by the suction members is above the top of the selected disk spindle member;

the motorized tray affixed to the selected disk spindle member retracts, allowing the disk suction pickup unit to travel freely along the transport axis.

4. The Data Transfer Unit

The data transfer unit comprises a set of stacked disk drive receptacle members and a variable number of stacked recordable disk drive members. The stacked disk drive receptacle members are stacked vertically inside the housing of the copy unit at right angles to both the disk pickup head and the disk spindle members. Each stacked recordable disk drive member fits in a slotted receptacle member located in one of the disk drive receptacle members and is positioned so that the extended position of each loading tray member for all stacked recordable disk members places the center of a loaded disk along the transport axis. This positioning allows the disk pickup head to insert or remove a CD-R disk from any stacked recordable disk drive member.

Each stacked recordable disk drive member sends and receives binary data with the computer software via a standard 50-pin SCSI connection between the stacked recordable disk drive member and the host computer. Loading and unloading of a CD-R disk in every stacked recordable disk drive member is accomplished through control of the loading tray member communicated through each stacked recordable disk drive member's SCSI connection.

In the preferred embodiment, a disk printer may be inserted above the stacked recordable disk drive members, allowing for the printing of symbols on the top side of CD-R disks before or after the copy operation. In this embodiment, the disk printer has a standard loading tray that when extended places the center of a loaded CD-R disk along the transport axis. The printer is placed below the top height of the disk pickup head so that the disk pickup head may load and unload disks from the loading tray of the printer.

An additional feature of the preferred embodiment is software control allowing for inspection of each burned CD-R disk for copy errors and control for placing defective burned CD-R disks onto a specified disk spindle member.

5. The Vacuum Regulator and the External Vacuum Pump

The vacuum regulator is housed inside the main copy assembly and is connected to the suction members by an air hose. An external air hose connects the vacuum regulator to the external vacuum pump that is physically separated from the main copy assembly in order to reduce vibrations inside the main copy assembly. The vacuum regulator maintains a constant pressure vacuum and is controlled by the microprocessor.

6. The Air Filtration Unit

The air filtration unit creates a flow of filtered air through the inside of the main copy assembly to significantly reduce CD-R disk read or write errors caused by dust or other contaminants that may be in the air surrounding the duplication system. The air filtration unit comprises a set of electric fan members, an air filter, a set of outflow vents, and an outer cover covering the outside of main copy assembly. The electric fan members are positioned along the back vertical face of the main copy assembly and when operated draw air into the inside of the main copy assembly.

Positioned along the inside vertical face of the main copy assembly is an air filter that filters air drawn in by the electric fan members before it can circulate through the inside of the main copy assembly. The filtered air then exits the main copy assembly through the outflow vents.

The Host Computer

No particular type of host computer is necessary to support the copy unit and the computer software. A conventional personal computer equipped with a SCSI throughput interface and a hard disk drive capable of retaining an image of the master data will suffice.

The Computer Software

In the preferred embodiment, the computer software necessary to direct the data transfer operations is written in the "C" programming language running under a Windows operating system. However, the computer software could be written using any computer language and operating system compatible with the computer used, provided Trace Mountain—type protocols can be sent to the copy unit via an RS-232 or SCSI connection between the host computer and the copy unit.

These and other features will become apparent from a consideration of the Detailed Description of the Preferred Embodiments.

DETAILED DESCRIPTION OF THE PREFERRED EMBODIMENTS

Figure 1:
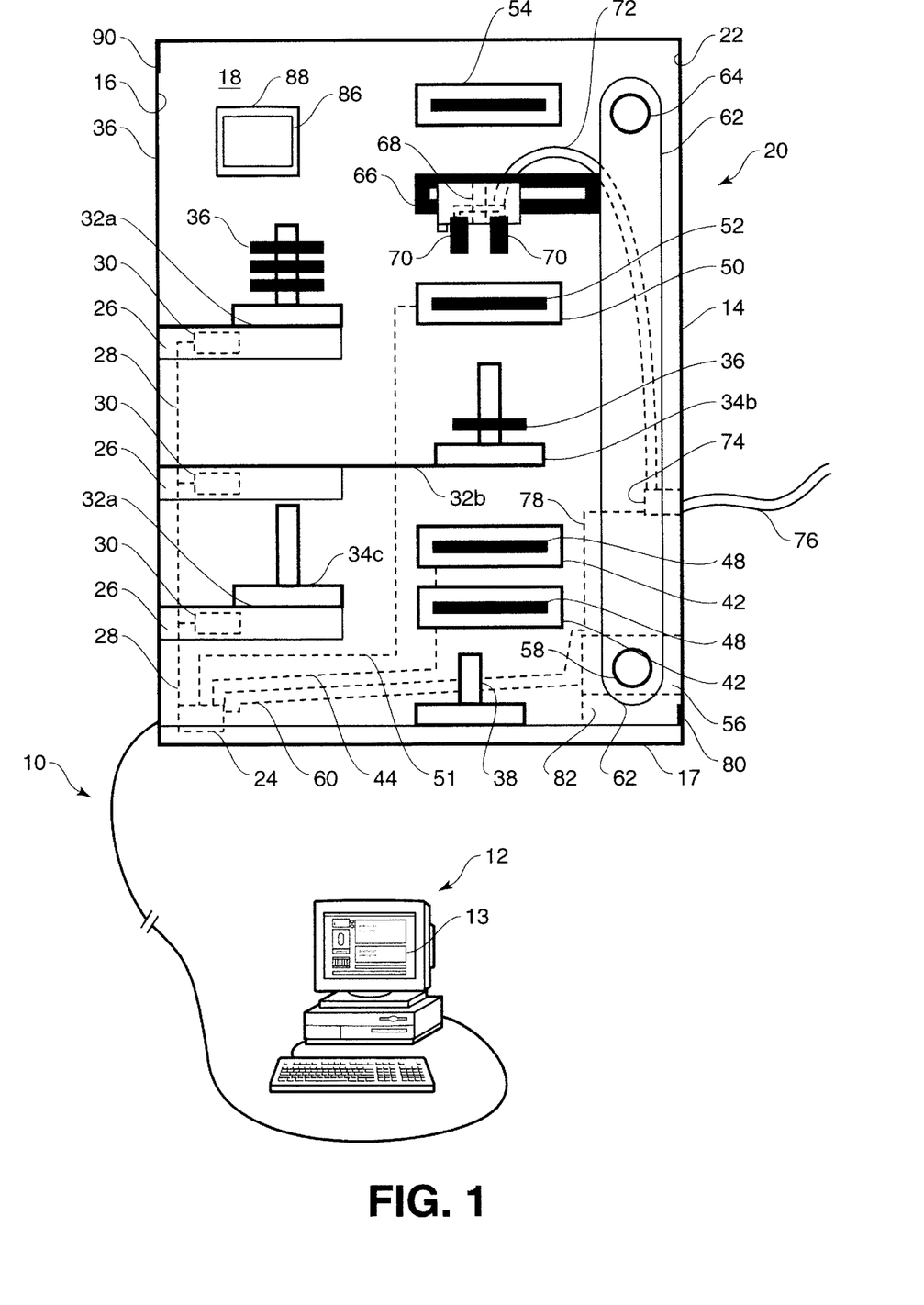
FIG. 1 is a schematic view of the compact disk duplication system of this invention with a front view of the copy unit.

Referring to FIG. 1, the programmable automatic compact disk duplication system of this invention is designated generally by the reference numeral 10. The duplication system 10 includes a host computer 12, shown schematically, connected to a copy unit 20. The host computer 12 comprises a programmable computer that includes computer software for providing a user interface for operating the copying process of the copy unit 20. It is to be understood that the host computer may be incorporated into the copy unit 20 with the copy unit having a keyboard or other input device such as a control panel for managing the operation of the copy unit 20.

The copy unit 20 includes an internal microprocessor 24 that is electrically connected to the host computer 12 for controlling the electromechanical operations of the copy unit 20. The copy unit 20 is constructed with a housing 14 having two opposing inner walls 16 and 22, a rear wall 18, and a deck 17 for supporting the electronics and drive assemblies.

A set of motorized tray members 26 are affixed to the inner wall 16 and extend horizontally towards the center of the space enclosed by housing 14. The motorized tray members 26 are electrically connected to the microprocessor 24 by a line 28 that sends a signal to each motorized tray member 26 to engage an inner motor member 30 that extends or retracts tray members 32. The illustration shown FIG. 1 depicts tray members 32a in their retracted position and tray member 32b in its extended position.

A removable disk spindle member 34 is connected to the top of each tray member 32 and holds CD-R disk members 36. A stationary disk spindle 38 is affixed to the deck 17 and serves as a holding receptacle for master disks, for additional CD-R disks, or for defective burned CD-R disks.

A set of stacked recordable disk drive members 42 are affixed to rear wall 18 and have disk drive tray members 48 that when extended protrude horizontally from the stacked recordable disk drive members 42 and towards the center of the space enclosed by housing 14. The recordable disk drive members 42 are electrically connected to the microprocessor 24 by a line 44 that sends signals to each recordable disk drive member 42 to operate the recordable disk members 42.

In its preferred embodiment the copy unit 20 includes a disk printer 50 that is affixed to rear wall 18 and has an input tray 52 that when extended protrudes horizontally from the disk printer 50 and towards the center of the space enclosed by housing 14. The printer 50 is electrically connected to the microprocessor 24 by a line 51 that sends signals to the printer 50 to control its operation.

Additionally, a disk holding area 54 is affixed to rear wall 18 and serves as a temporary holding area 54 for CD-R disks that are manually stored or removed by the user.

Affixed to the deck 17 and inner wall 22 is a motor 56 that rotates a gear 58 when engaged. The motor 56 is electrically connected to the microprocessor 24 by a line 60 that sends signals to activate the motor 56. Surrounding the gear 58 is a belt 62 that travels vertically along the inner wall 22 and wraps around a pulley wheel 64 that is affixed to the rear wall 18.

Affixed to the outer surface of the belt 62 that faces toward the center of the space enclosed by housing 14 is a horizontal arm 66 having a vertical aperture 68 located in the center of the horizontal arm 66. The underside of the horizontal arm 66 has three suction members 70 (two visible) creating sufficient suction to hold one disk against the underside of the horizontal arm 66.

A vacuum hose 72 connects to the suction members 70 and runs along inner wall 22 where it connects with vacuum regulator 74. The vacuum regulator 74 is connected to an external hose 76 that is connected to an external vacuum pump (not shown). The vacuum regulator 74 is electrically connected to the microprocessor 24 by a line 78 that sends signals to activate the vacuum regulator 74, allowing for a suction force to appear at the end of the suction members 70.

A female power receptacle 80 allows for attachment of an electrical cord (not shown) providing standard 120V AC to a transformer 82. The transformer 82 supplies power to components throughout the main copy assembly 20.

Located on the rear wall 18 are one or more electric fan members 86 that draw in air to ventilate the main copy assembly 20 and prevent heat build-up. An air filter 88 is positioned behind the electric fan members 86 and filters the air drawn in by the electric fan members 86 before the air travels through the interior of the main copy assembly 20. The filtered air then exits the interior of the main copy assembly 20 through vent members 90 located on inner wall 16.

In the preferred embodiment of FIG. 1, the copy unit 20 has three disk spindle members 34. In such a configuration disk spindle member 34a hold s blank CD-R disks, disk spindle member 34b holds burned CD-R disks, and disk spindle member 34c holds defective burned CD-R disks. The stationary disk spindle 38 is designated as the disk spindle member holding one or more master compact disks.

Referring to FIGS. 2A through 2E, a flowchart of the procedures performed in a disk copy operation, are shown beginning with START in item step 190. The logic necessary to perform a disk copy operation is programmed into the computer software on the host computer and programmed into the microprocessor located inside the copy unit.

Figure 2A:
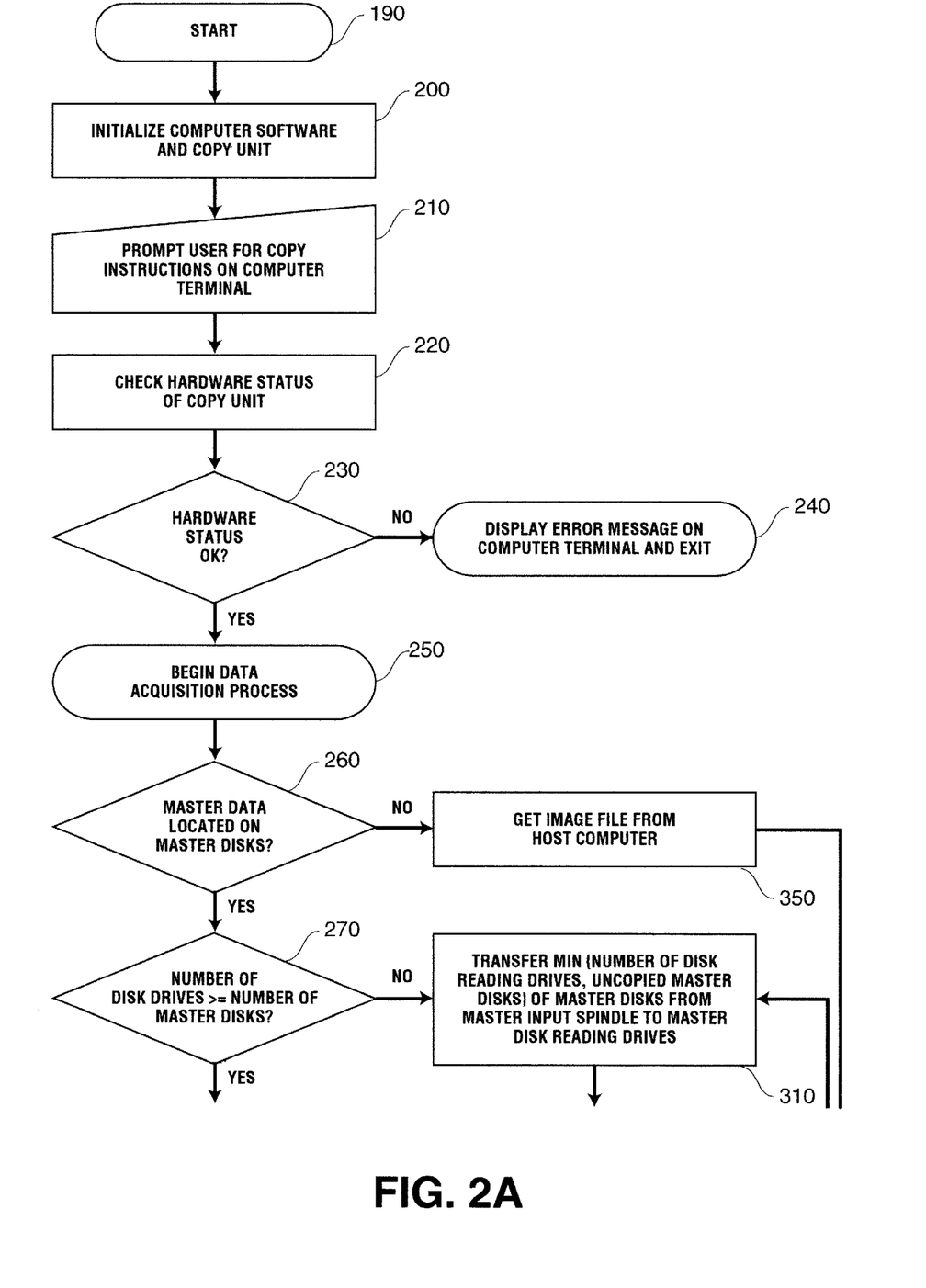
FIGS. 2A–2E are continuous flowchart diagrams of the procedures performed in a disk copy operation.

A user begins a disk copy operation by loading master disks on stationary disk spindle 38 (also designated as the master disk spindle) and loading blank recordable disks onto disk spindle member 34a. The user then supplies power to the copy unit 20 and starts the computer software located in the host computer 12. These initialization subprocedures are indicated in item step 200. A display 13 connected to the host computer 12 then prompts the user for information regarding the selection of the disk spindle members for the blank and burned CD-R disks. The user also selects a disk output spindle that will temporarily hold master disks after the data transfer from each master disk to the host computer 12. The user also supplies instructions indicating the tracks on the master disks to be copied. This operation is indicated in item step 210.

When first powered on, the internal microprocessor 24 sends electrical signals to test the operation of the arm 66, as indicated in item step 220. The microprocessor 24 sends a set of flags back to the computer software to signal the status of the hardware located on the copy unit 20, as indicated in item step 230. If the computer software receives a status flag indicating hardware failure, the computer software issues a display error message for the user to decode, and the copy process is terminated, as indicated in item step 240.

If the computer software receives status flags indicating the hardware is operational, the computer software sends instructions to the microprocessor that comprise a data acquisition subprocedure. The beginning of the data acquisition subprocedure is indicated in item step 250 and comprises item steps 260 through 340.

In item step 260, the computer software checks if a disk drive on the host computer contains an image of the master data. If an image file already exists, control of the software is transferred to item step 360. Otherwise, control of the computer software is transferred to item step 270.

Figure 2B:
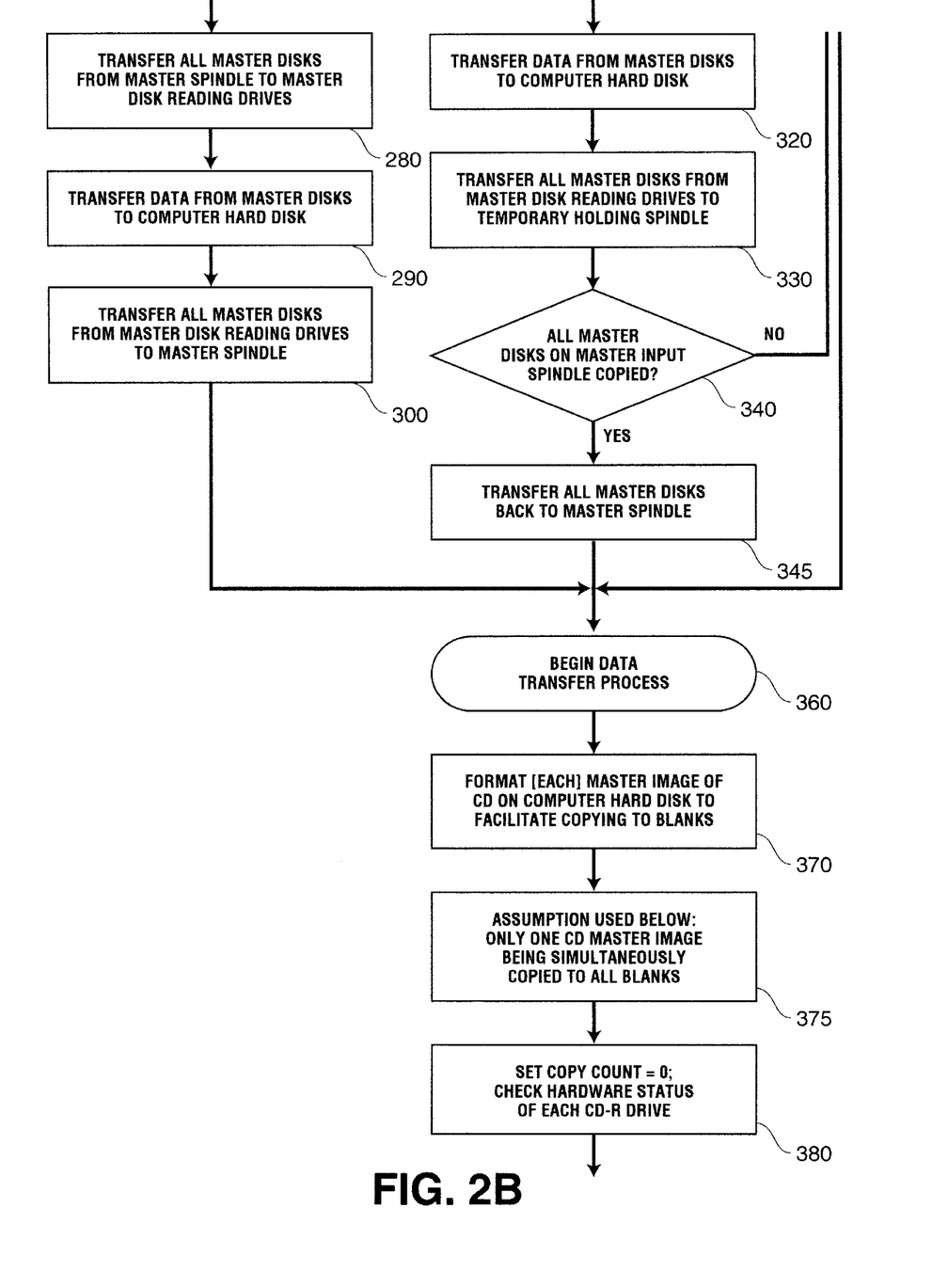

As indicated in item step 270, the computer software first compares the number of disk drives to the number of master disks loaded on master disk spindle 38. If the number stacked recordable disk drive members 42 is greater than or equal to the number of master disks, the computer software sends a command set to the microprocessor 24 to transfer each master disk to an available stacked recordable disk drive 42, as indicated in item step 280.

The computer software then sequentially issues read commands to each stacked recordable disk drive member 42 containing a master disk and transfers the source data from each master disk to the host computer 12. These commands are summarized in item step 290. Once the data transfer process is completed, the computer software sends a command set to the microprocessor to transfer each master disk back to the master disk spindle 38, as indicated in item step 300, and the data acquisition subprocedure is complete.

If the number of stacked recordable disk drives 42 is less than the number of master disks, the computer software must loop through item steps 310 through 340 until all master disks have been transferred to an available stacked recordable disk drive 42.

This loop begins when the computer software sends a command set to the microprocessor 24 to transfer the maximum number of remaining uncopied master disks held by the master disk spindle 38 to the stacked recordable disk drive members 42, as indicated in item step 310. Then in item step 320, data is transferred from the master disks to the host computer 12 in the same manner as in item step 280.

After all data from the master disks loaded in stacked recordable disk drives 42 has been transferred to the host computer 12, the master disks are temporarily transferred to a disk spindle member spindle 34 as indicated in item step 330.

The computer software completes this loop as indicated in item step 340 by comparing the number of uncopied master disks with zero, and returning to the top of the loop at item step 310 if any uncopied master disks remain. Once the data acquisition subprocedure is completed, all master disks are transferred back to the stationary disk spindle member 38, as indicated in step 345, and control of the computer software is transferred to the beginning of the data transfer subprocedure, indicated as item step 360.

Figure 2C:
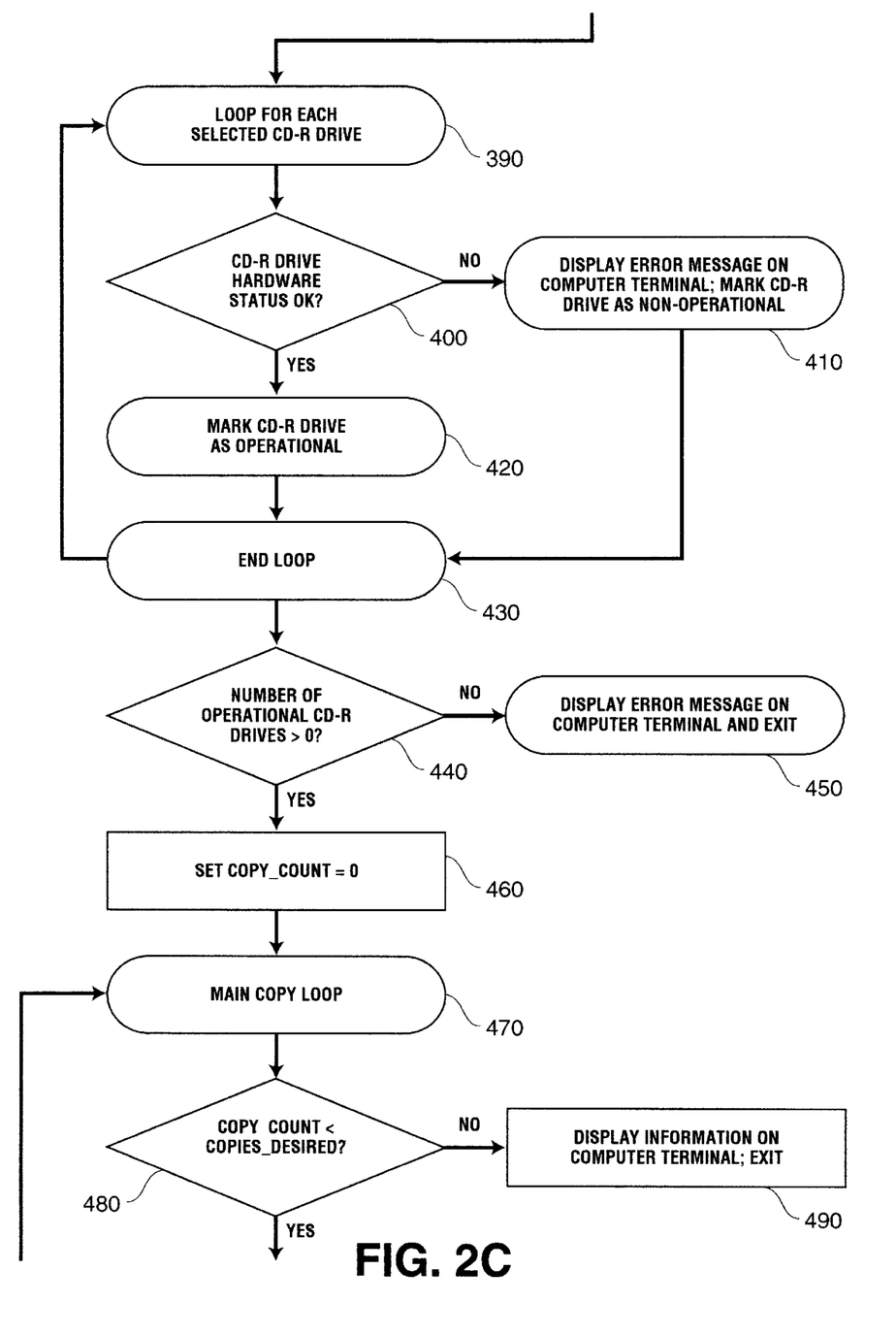

At the beginning of the data transfer subprocedure, the computer software will, if necessary, reformat the image of the source data located on the hard drive of the host computer to ensure optimal recording speed and accuracy. This computation is indicated in item step 370. Item box 375 contains a comment for the following steps. A variable containing the number of copies made is initialized to zero, as indicated in item step 380.

Item steps 390 through 430 correspond to a loop over all selected stacked recordable disk drive members 42 whereby the computer software first issues commands to the microprocessor 24 to query the hardware status of each stacked recordable disk drive member 42, as indicated in item step 400. The computer software will alert the user of any stacked recordable disk drive member 42 that the microprocessor 24 has identified as non-operational, as indicated in step 410. Otherwise, the computer software will set a flag indicating that the queried CD-R drive is operational, as indicated in item step 420.

Once the hardware test loop is completed, the computer software branches on a test of the number of operational stacked recordable disk drive members 42, as indicated in item step 440. The computer software will exit the copy process if no stacked recordable disk drive members 42 are operational, as indicated in item step 450. Otherwise, the computer software initializes to zero a variable containing the number of copies made, as indicated in item step 460.

The computer software then enters a main copy loop, indicated in item step 470, that repeats until the number of copies made equals the desired number of copies. This comparison operation is made in item step 480, and the proper termination of the copy process occurs in item step 490.

Figure 2D:
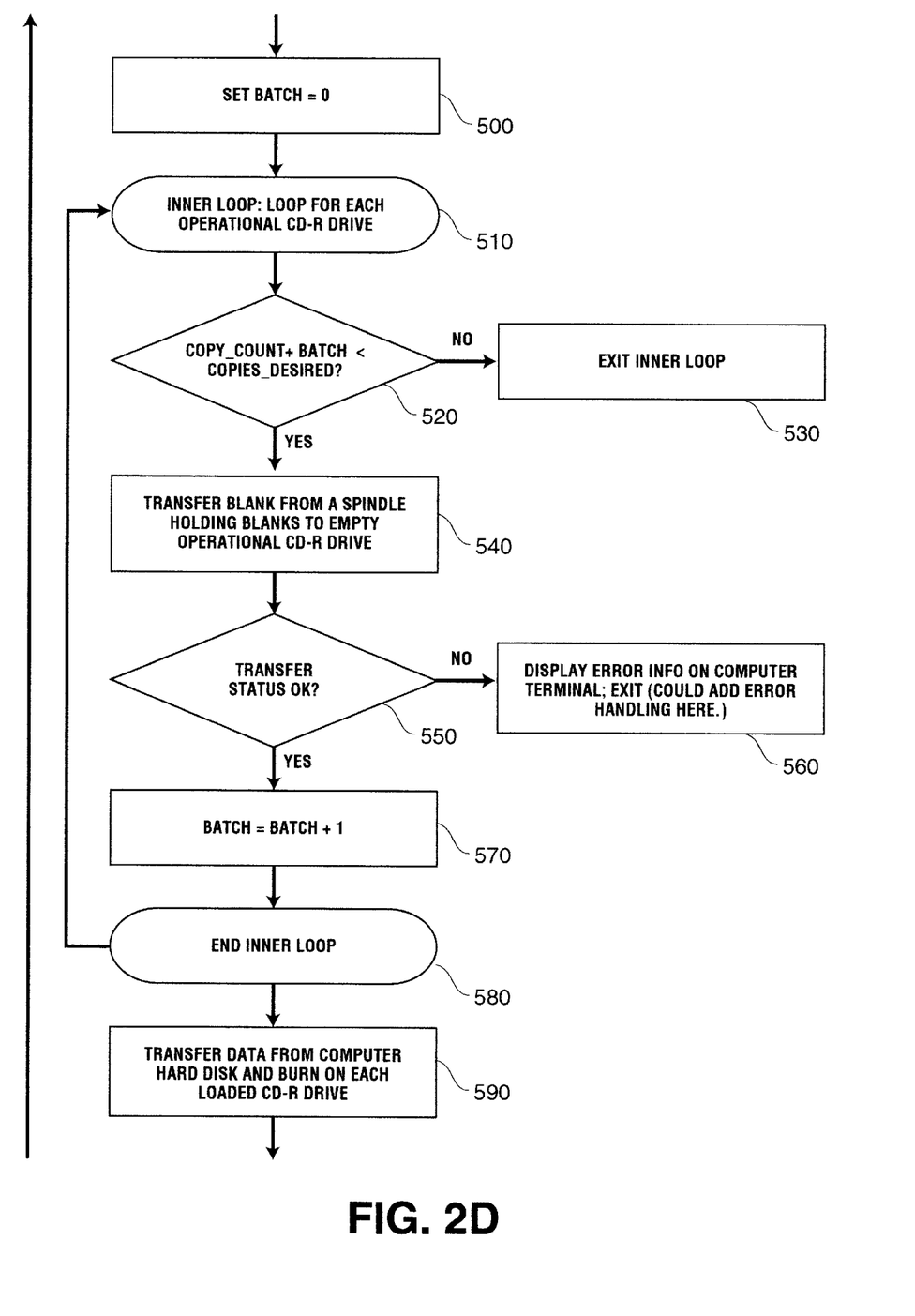

If the number of copies made is less than the number of copies desired, the computer software initializes to zero a variable containing the number of copies currently loaded in the stacked recordable disk drive members 42, as indicated in item step 500. The computer software then enters an inner loop comprising item steps 510 through 580, with each cycle of the inner loop corresponding to the transfer of a blank disk to an available operational stacked recordable disk drive member 42.

This inner loop begins with a comparison of the number of copies desired with the sum of the copies already made plus the number of disks loaded the current batch transfer, as indicated in item step 520. If the sum of the copies already made plus current number of disks loaded into the stacked recordable disk drive members 42 equals the number of copies desired, the inner loop terminates, as indicated in item step 530.

Otherwise, the computer software issues a set of commands to the microprocessor 24 to transfer a blank disk to the next available stacked recordable disk drive member 42, as indicated in item step 540. The computer software then checks the status of the disk transfer, as indicated in item step 550, and will terminate or otherwise commence other error handling subprocedures if the disk transfer failed, as indicated in item step 560. Otherwise, the variable containing the number of disks loaded is incremented by one, as indicated in item step 570.

Once the inner loop terminates at item step 580, the stacked recordable disk drive members 42 have been loaded with the maximum number of blank disks, the computer software sends electrical signal instructions that activate the physical transfer of source data to each blank disk loaded in the loaded stacked recordable disk drive members 42, as indicated in item step 590. The computer software then examines copy status flags from each loaded stacked recordable disk drive member 42, as indicated in item step 600, and issues a command set to the microprocessor 24 to discard burned CD-R disks corresponding to any bad copy status flags, as indicated in item step 610.

Figure 2E:
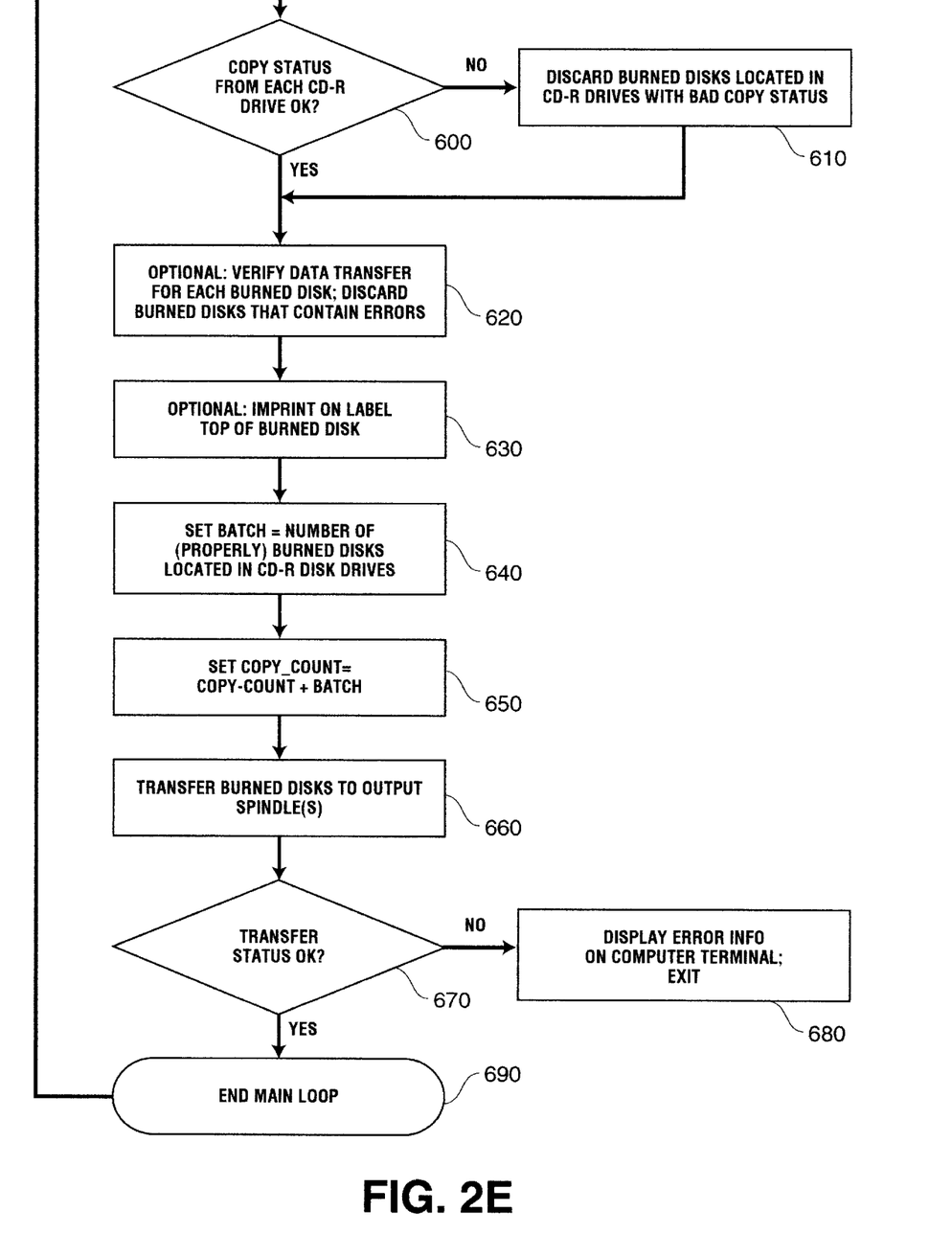

In item step 620, the user can optionally configure the computer software to perform a data verification on each burned disk that is currently loaded in the stacked recordable disk drive members 42. In this subprocedure, the computer software would direct each stacked recordable disk drive member 42 to read the data off the burned disk and compare it to the source data residing on the hard drive of the host computer 12. Defective burned CD-R disks would be transferred to disk spindle member 34c as indicated in item step 610.

In item step 630, the user can optionally configure the copy unit to include a print application unit that imprints or labels the top of each burned CD-R disk with information transferred from the computer software. In this subprocedure, the burned CD-R disk is ejected from its stacked recordable disk drive member 42 and vertically transported by the arm 66 and then loaded into the input tray 52 of the printer 50. After imprinting, the burned CD-R disk is transported to a disk spindle member 34 in the manner described above.

The variable containing the number of loaded stacked recordable disk drives is reset to equal the number of properly burned CD-R disks, as indicated in item step 640. The total number of copies made is then incremented by the number of properly burned CD-R disks, as indicated in step 650. The computer software then issues a command set to the microprocessor 24 directing the transfer of the properly burned CD-R disks to one of the designated output spindles, as indicated in step 660. The computer software receives a status signal from the microprocessor 24 indicating whether the transfer occurred properly, as indicated in item step 670, and will display an error message and exit if a disk transfer failed, as indicated in step 680. Otherwise, control of the computer software drops to the bottom of the main loop 690 and then returns to the top of the main loop at item step 470.

What is claimed is:

1. A system for the duplication of binary data onto recordable compact disks, the system comprising:
   a vacuum pump; and
   a copy unit, comprising:
      at least one set of multiple stacked recordable disk drive members;
      a transport tower;
      a set of horizontal motorized tray members, stacked vertically parallel to the transport tower, each horizontal motorized tray member having a retracted position and an extended position;
      a set of disk spindle members, each disk spindle member affixed to the top horizontal face of one of the horizontal motorized tray members, each recordable compact disk horizontally seated on a disk spindle member; and,
      an arm, connected to the transport tower and the vacuum pump, the arm having a disk pickup head that travels vertically along the transport tower, the disk pickup head engaging the upper-most compact disk seated on a selected disk spindle member affixed to one of the horizontal motorized tray members configured in its extended position, the arm transporting the compact disk engaged by the disk pickup head to a selected stacked recordable disk drive member.

2. The system of claim 1, wherein the number of multiple stacked recordable disk drive members may be increased or decreased by the user.

3. The system of claim 2, wherein the disk spindle members may be removed from or re-attached to the copy unit.

4. The system of claim 3, wherein a host computer containing computer software is connected to the copy unit, the computer software providing a user interface for output diagnostic messages of the copy unit through peripherals connected to the host computer.

5. The system of claim 4, wherein the host computer has a hard disk drive, the hard disk drive containing the binary data to be copied to the recordable compact disks.

6. The system of claim 5, wherein a microprocessor located inside the copy unit controls movement of the transport tower and the arm.

7. The system of claim 6, wherein the microprocessor is electrically connected to the host computer, the microprocessor sending electrical signals to the host computer and the microprocessor receiving electrical signal commands from the host computer, the computer software providing a user interface for control of the copy unit.

8. The system of claim 7, wherein the binary data to be copied is located on one or more master compact disks and is transferred to the hard disk drive of the host computer by at least one stacked recordable disk drive member.

9. The system of claim 8, wherein the computer software and the microprocessor provide a user interface for user input copy instructions for the control of each master compact disk during the duplication of the data when each master compact disk is held by a disk spindle member on the copy unit.

10. The system of claim 9, wherein the copy unit has a reject disk spindle member, the transport of a defective burned recordable compact disk to the reject disk spindle member controlled by an electrical signal sent to the microprocessor by the stacked recordable disk drive member after the stacked recordable disk drive member attempts to read the burned recordable compact disk.

11. The system of claim 10, wherein the copy unit has a print application area, the arm transporting a burned recordable compact disk to the print application area for application of symbols on the upper face of the burned recordable compact disk, the arm then transporting the labeled burned disk to any disk spindle member affixed to one of the horizontal motorized tray members configured in its extended position.

12. The system of claim 11, wherein the copy unit has an air filtration unit, the air filtration unit comprising:

a set of electric fan members, the electric fan members drawing air into the inside of the copy unit;

an air filter, the air filter positioned along the inside vertical face of the copy unit and filtering the air drawn into the copy unit by the electric fan members; and a set of outflow vents located on the copy unit, the outflow vents allowing air drawn through the copy unit by the electric fan members to exit the copy unit.

13. A compact disk recording system for the duplication of binary data onto recordable compact disks, the system comprising:

lifting means for engaging and transporting a recordable compact disk in a vertical direction;

a set of multiple stacked recordable disk drives;

disk stacking means for holding recordable compact disks in at least two stacks; and horizontal disk transport means for transporting the disk stacking means into the path of travel of the lifting means, thereby allowing the lifting means to engage and transport a recordable compact disk located at the top of one of the stacks to any multiple stacked recordable disk drive member, or allowing the lifting means to transport any recordable compact disk located in one of the multiple stacked recordable disk drives to the top of one of the stacks.

14. The system of claim 13, wherein the system has master disk data transfer means for reading master data located on one or more compact disks and then transferring the master data onto any recordable compact disk.

15. The system of claim 14, wherein the system has user interface means for pre-programming the control of the duplication of data.

16. The system of claim 15, wherein the system has defective recordable compact disk detection means for detecting defective burned recordable compact disks.

17. The system of claim 16, wherein the system has labeling means for the application of symbols on the upper face of the burned recordable compact disks and transporting the labeled burned disk to the top of one of the stacks.

18. The system of claim 17, wherein the system has air filtration means for circulating filtered air in the closed region surrounding the multiple stacked recordable disk drives.

* * * * *